V. DI SANTE.
AIR FILTER.
APPLICATION FILED OCT. 7, 1918.

1,319,573.

Patented Oct. 21, 1919.

Inventor
Vito DiSante.

By

Attorney

UNITED STATES PATENT OFFICE.

VITO DI SANTE, OF WICHITA, KANSAS.

AIR-FILTER.

1,319,573.  Specification of Letters Patent.  Patented Oct. 21, 1919.

Application filed October 7, 1918. Serial No. 257,239.

*To all whom it may concern:*

Be it known that I, VITO DI SANTE, of Wichita, in the county of Sedgwick and State of Kansas, have invented certain new and useful Improvements in Air-Filters; and I do hereby declare the following to be a full, clear, and exact description of the invention, such as will enable others skilled in the art to which it appertains to make and use the same.

This invention is an elaboration of the air filter for internal combustion engines embraced by Letters Patent No. 1,288,393, issued to me December 17, 1918.

Figure 2:
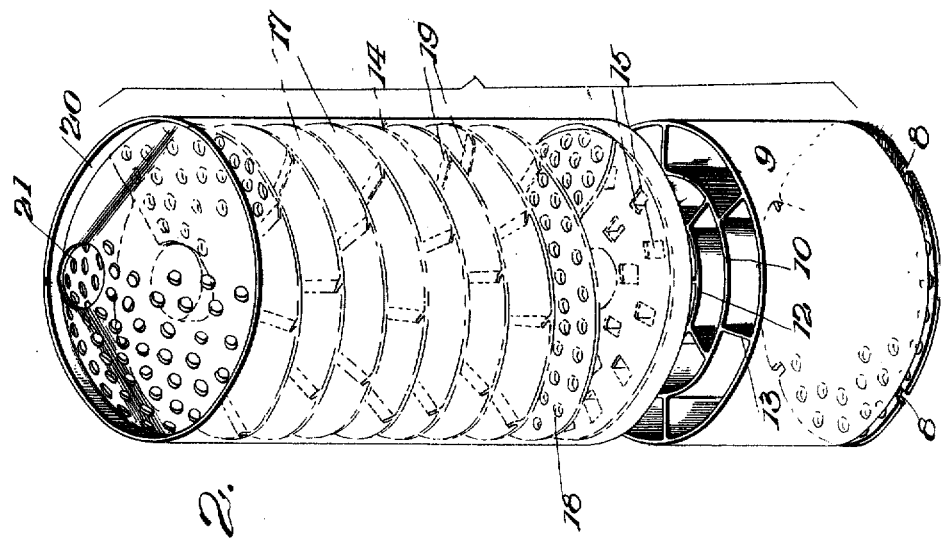
Figure 1:
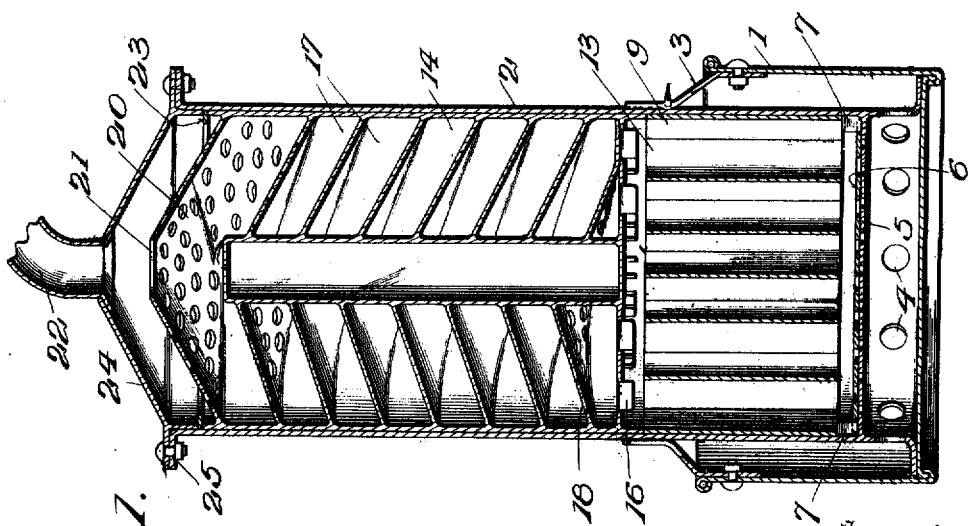

Figure 1 is a central vertical sectional view. Fig. 2 is a perspective of the interior parts of the collecting vessel removed.

1 designates the water container and 2 the collecting vessel. Both are preferably of cylindrical form and the vessel is mounted upright in the container and secured thereto by brackets 3. Near its lower end the vessel is formed with inlet apertures 4 and above these is a perforated plate 5. A second perforated plate 6 rests upon plate 5 and its perforations are out of alinement with those of plate 5. Plate 5 is fixed in the vessel but plate 6 is free to move vertically under the suction action. It is held as against axial turn by lugs 7 formed on the walls of the vessel and received by notches 8 in the plate.

Above these plates I have shown the vessel containing a chamber 9 formed with a series of compartments. The chamber is of cylindrical form and is made with two concentric walls 10 and 12, the circular spaces formed by these walls being divided by partitions 13. The construction described prevents splashing when the device is applied to the engine of an automobile traveling over rough roads.

Mounted above the chamber 9 is a cage 14 whose lower end is perforated as at 15 by stamping out the metal and bending the tangs 16 downward. Above this end the cage is provided with a spirally formed surface 17 the lowermost and topmost convolutions of which are perforated as at 18. The intermediate convolutions are imperforate and provided with stops 19 to arrest the passage of the water that may be entrained with the air by the suction and cause it to return to its container. The top 20 of the cage is conical and perforated and formed with an enlarged central outlet 21 in line with a pipe 22 leading from vessel 2 to a carbureter.

The cage is preferably formed of one integral structure as shown in Fig. 2 which may be held in the vessel 2 by the washer or gasket 23. The cover 24 is shown bolted to the vessel at 25 to hold the cage firmly in position.

The advantages of the perforated plates 5, 6, have been set forth in my patent above referred to and those of the chamber 9 are recited in my pending application Serial No. 257,238, filed October 7, 1918. As in all of my inventions, my object in the present instance is to provide improved baffling means whereby the air and water will be allowed to travel through the filter but the water will be successively partially arrested and allowed to return to the water container without materially interfering with the flow of air and water in the opposite direction. The structure described is well adapted to the purpose. The water may flow back freely through the perforations 15 and the tangs 16 act as baffles. In the ascent over the spiral surface 17 the water again finds a ready outlet through the perforations 18 of the lowermost convolution. In the succeeding convolutions, however, I have found it of advantage to arrest the water by the stops 19. It may then flow back over the spiral surface and drop through perforations 18 and 15. When the combined fluids reach the top of the cage 14 I make provision for insuring the complete separation and return of the water by the perforations in the topmost convolution.

The cost of manufacture is materially lessened by making the cage in one integral structure which may be removably held in the casing 2 by the gasket 23, access to which is gained by the bolts 25 securing the cover to the casing.

I claim as my invention:

1. In an air filter, the combination with a water container, of a collecting vessel mounted in said container, and a spirally formed surface in said vessel whose upper and lower convolutions are perforated and the intermediate convolutions imperforate and provided with stops to arrest the travel of the water entrained with the air.

2. In an air filter, the combination with a water container, of a collecting vessel mounted in said container, and a cage in said vessel having its lower end stamped to form perforations and tangs depending from said perforations, and having an upper spirally formed surface with its lowermost convolution perforated and a series of superposed imperforate convolutions.

3. In an air filter, the combination with a water container, of a collecting vessel mounted in said container, and an integrally formed cage having spiral convolutions removably mounted in said vessel, said cage having its upper and lower convolutions perforated and the intermediate convolutions imperforate and provided with stops.

In testimony whereof, I have signed this specification.

VITO DI SANTE.

Copies of this patent may be obtained for five cents each, by addressing the "Commissioner of Patents, Washington, D. C."